Patented June 18, 1940

2,204,896

UNITED STATES PATENT OFFICE 2,204,896

COFFEE PROCESSING

William Kappenberg, Queens Village, N. Y., assignor to Coffee Products Corporation, New York, N. Y., a corporation of New York No Drawing. Application November 23, 1937, Serial No. 176,037

2 Claims. (Cl. 99—71)

This invention relates to an improved aqueous coffee extract or brew which may be a concentrated product or a product of about the concentration of ordinary coffee brews; and more particularly to an improved aqueous coffee extract which has increased flavoring strength, which is more mellow than ordinary extracts and brews and which has a greatly decreased tendency to become rancid. The invention includes not only this improved product, but also a novel process by which it may be produced.

Heretofore, coffee extracts, and particularly concentrated aqueous coffee extracts, have had an objectionable tendency to become rancid and have been subject to spoilage because of decomposition caused by yeast, molds, or the like, such that a large proportion of such products have rapidly become unmerchantable because of such changes. To overcome the spoilage caused by yeast, molds, or the like, it has been proposed to pasteurize such extracts; and pasteurization for this purpose has been resorted to with more or less frequency. However, when ordinary coffee extracts are subjected to pasteurization, they become bitter and develop an off-flavor, such that the pasteurized products do not have the desirable flavor and aroma of the unpasteurized products, although they do not have the same tendency to decompose because of the action of yeast, molds, etc. On the other hand, such pasteurization does not affect the tendency of the extracts to become rancid, and losses because of rancidity are in no way overcome by such pasteurization.

In accordance with the present invention, a small amount of glycerin is added to a coffee extract at some stage prior to pasteurization or heat treatment; and the coffee extract with a small percentage of glycerin in it is subjected to a heat treatment analogous to pasteurization. This heat treatment effectively destroys the yeast, molds, etc., responsible for a large proportion of the spoilage of such products just as does ordinary pasteurization, but the presence of the small amount of glycerin prevents the extract from becoming bitter and developing an off-flavor, and, in fact, increases the flavoring strength of the extracts and renders them more mellow, while at the same time, the treatment greatly decreases the tendency of the extracts to become rancid. The small amount of glycerin which is used is unobjectionable in the final product. I can advance no theory which explains the greatly decreased tendency of the treated extracts to becoming rancid, nor can I explain the improvement in mellowness and flavoring strength noted in extracts which have been subjected to such treatment.

In carrying out the present invention, a small amount of glycerin, e. g., from about 3% to about 8% based upon the roasted coffee used, is added to the aqueous extract at some stage in its production. The glycerin may be added to the hot water used in making the extract or it may be added to the extract before or after concentration, if a concentrated extract is to be made. The aqueous extract, containing the glycerin, is subjected to a heat treatment at temperatures ranging from about 70° C. to about 90° C., or somewhat higher, for from about one-half hour to about four hours. In general, with the higher temperatures the time of heating should be relatively short, whereas with the lower temperatures, e. g., around 70° C., the longer periods of heating should be used. Also the more concentrated the extract is, the lower should be the temperature of heating. With highly concentrated aqueous extracts, containing, for example, around 30 to 40% solids, the temperatures should be in the range of about 70° C. to about 90° C., whereas with more dilute extracts, corresponding to ordinary coffee brews, for example, even higher temperatures, ranging up to about 110° C., may be used.

The heat treatment advantageously is carried out in final containers in which the product is to be stored for marketing, so as to avoid any possibility of contamination by yeast, molds, or the like, after the heat treatment; although it will be appreciated that it is not necessary to carry out the heat treatment in the final containers, as the improved flavor and aroma of the product and increased resistance to becoming rancid is obtained by such heat treatment in the presence of a small amount of glycerin at any time during the processing.

The invention will be described in detail in the following example in connection with the production of a concentrated aqueous coffee extract, but it is not limited thereto.

*Example.*—A relatively strong coffee brew is made by extracting freshly roasted coffee with water, in proportions such that about 5 gallons of the extract are produced from 15 pounds of roasted coffee. Before extraction with the water, about 16 ounces of glycerin are added to it for each 15 pounds of coffee, so that the extract, consisting of about 5 gallons contains about 16 ounces of glycerin, or about 6.5% of glycerin based on the weight of roasted coffee used. The extraction is carried out with hot or boiling water in the ordinary or any suitable way, advantageously in a closed apparatus such that all vapors and gases given off are passed to a condenser where condensation of readily condensible constituents takes place, and from which the condensate is drawn off to be subsequently added to the final concentrated extract, the uncondensible gases being led to a scrubber.

The extract from the extraction, containing the small proportion of glycerin, is evaporated in a vacuum evaporator at a low temperature, to produce a concentrated extract, about 5 gallons of the initial extract being concentrated to a volume of about 1 gallon.

The concentrated and purified extract so produced is then advantageously introduced into a scrubber for scrubbing and absorbing the uncondensed vapors and gases from the extraction operation. The condensate from the extraction operation is also incorporated in the extract, yielding a concentrated and purified extract containing both the condensible and the uncondensible constituents given off during the extraction operation.

This concentrated extract is then sealed in bottles or other suitable containers, after which it is subjected to a heat treatment at temperatures ranging from about 70° C. to about 90° C. for a period of time ranging from about one-half hour to about four hours, the longer periods of time being used with the lower temperatures. This heat treatment effectively kills molds, yeast and the like and prevents decomposition due to such organisms on standing or storage. At the same time, the heat treatment, because of the presence of glycerin in the extract, greatly decreases the tendency of the extract to become rancid and imparts to the extract a more mellow flavor and an increased flavoring strength, without imparting to the extract the bitterness or off-flavor which has heretofore characterized pasteurized coffee extracts.

While the invention has been described in detail in connection with a particular process for the production of an aqueous concentrated extract, it is equally applicable to extracts produced by other processes, whether concentrated or not.

I claim:

1. The process of producing an improved coffee extract which comprises adding to an aqueous extract of roasted coffee a small amount of glycerin and subjecting the extract to a heat treatment to impart improved flavor characteristics and increased resistance to rancidity to the extract, said heat treatment being conducted at temperatures ranging from about 70° C. to about 90° C. for a period of time ranging from about one-half hour to about four hours, the longer periods of time being used with the lower temperatures.

2. The process of producing an improved coffee product which comprises producing a concentrated aqueous coffee extract containing a small amount of glycerine and subjecting said extract to a heat treatment to impart improved flavor characteristics and increased resistance to rancidity to the extract, said heat treatment being conducted at temperatures ranging from about 70° C. to about 90° C. for a period of time ranging from about one-half hour to about four hours, the longer periods of time being used with the lower temperatures.

WILLIAM KAPPENBERG.